United States Patent Office 2,765,405
Patented Oct. 2, 1956

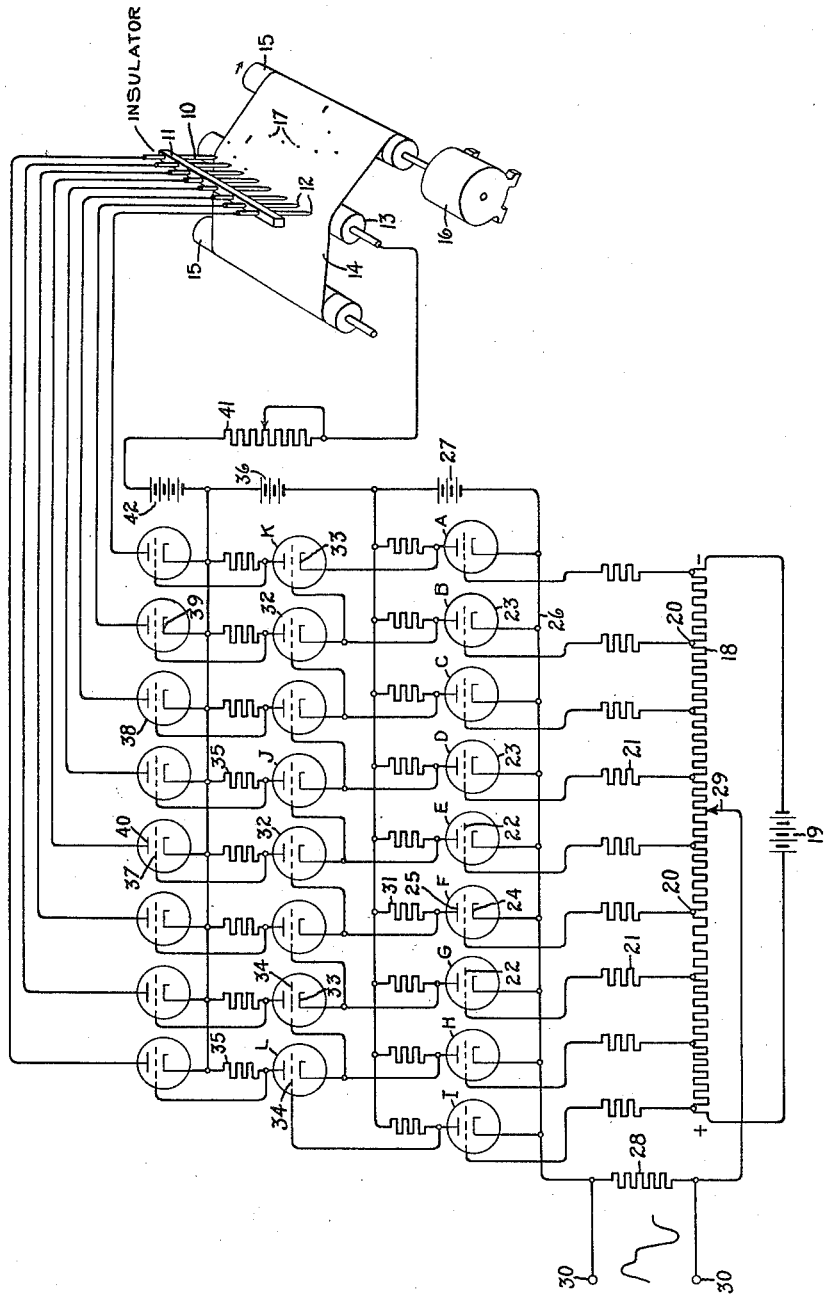

2,765,405

VOLTAGE LEVEL SWITCHING NETWORK

Sooren Edward Gamarekian, Scotia, N. Y., assignor to General Electric Company, a corporation of New York Original application September 29, 1949, Serial No. 118,532, now Patent No. 2,639,209, dated May 19, 1953. Divided and this application March 12, 1952, Serial No. 276,198

3 Claims. (Cl. 250—27)

This application is a division of my copending application Serial No. 118,532 entitled "Recording Apparatus" filed September 12, 1951, now Patent 2,639,209 issued May 19, 1953, and assigned to the assignee of the present invention. The present invention relates to electric channel switching apparatus suitable for use in recorders, and more particularly to apparatus for energizing independent electrical circuits or devices in accord with different instantaneous amplitude levels of an input voltage signal.

High speed recorders capable of following and instantly recording high frequency variations in the amplitude of a signal voltage are sorely needed for many industrial, scientific and military applications. Conventional moving stylus-type recorders are inherently limited in their speed of recordation because of the mechanical inertia of the moving stylus. Rotating helix type spark recorders are similarly restricted in speed of operation by the necessity of converting the instantaneous amplitude of an input signal voltage into a representative time interval during each revolution of the helix.

In my above-mentioned application, Serial No. 118,532 there is disclosed a new type high speed recorder which contains no moving components other than a moving electro-sensitive paper upon which the record is printed. This new type recorder utilizes a linear array of spaced electrodes supported adjacent an electrosensitive recording paper, the position of each electrode in the array representing a corresponding amplitude level of an input signal to be recorded, and includes means for selectively passing current from each electrode through the recording paper in response to corresponding amplitude levels of the signal voltage to produce marks whose relative positions on the paper represent these amplitude levels of the signal voltage.

The effectiveness and speed of recordation of such recorders obviously depends upon the efficiency and speed with which a particular electrode current supplying channel can be selected upon the occurrence of a predetermined amplitude level of input signal voltage.

Accordingly, one object of the present invention is to provide a "voltage level switching network" for instantly and selectively controlling the flow of current in a plurality of independent electrical channels or devices in response to various predetermined amplitude levels of an input voltage function.

Another object of the invention is to provide a completely electronic voltage level switching network having no moving components or mechanical contact making members to retard its switching speed.

Another object of the invention is to provide a voltage level switching network capable of following and switching, in accord with voltage amplitude level variations, at frequencies above 1000 cycles per second.

In fulfillment of the foregoing objects, it is a further object of the invention to provide a high speed "voltage level selection circuit" which instantly provides independent output voltages in response to different amplitude levels of an input signal voltage.

In general, my improved voltage level switching network comprises an array of electron discharge devices each connected to control the electrical energy in one of a plurality of electrical channels or devices and each arranged to receive and be energized by the differential voltage output of a respective pair of a corresponding array of voltage amplifier stages. Each of the amplifier stages includes a current controlling electron discharge device and is constructed to produce an output voltage of one magnitude when its discharge device is conducting and of a different magnitude when its discharge device is not conducting. The ratio of a series of conducting discharge devices to a series of non-conducting devices in this amplifier stage array is controlled by a common biasing and input circuit to vary in accord with the instantaneous amplitude level variations of an input signal voltage. Since the conducting amplifier stages all provide a same output voltage, while the non-conducting amplifier stages likewise provide a same output voltage which is different from that of the conducting stages, a differential output voltage exists only between one pair of adjacent amplifiers at any given input signal amplitude level, and the particular channel connected to receive this differential voltage is energized whenever that amplitude level occurs.

The novel features which I believe to be characteristic of my invention are set forth with particularity in the appended claims. My invention itself, however, together with further objects and advantages thereof can best be understood by reference to the following description taken in connection with the accompanying drawing in which the sole figure is a schematic diagram of an electrical circuit and recording system embodying my invention.

Referring to the drawing, I have shown my invention in one form as embodied in a recorder comprising a series or array of recording electrodes 10 supported in linear spaced relation by an insulating bar 11 through which the electrodes 10 are inserted. The tips 12 of the electrodes 10 are maintained in close proximity to the surface of an electrically conductive printing member 13, and a sheet of electrosensitive recording material 14 is fed intermediate the electrodes 10 and the printing member 13 by such means as rollers 15 driven at a determinable speed by motor 16. In order to enable the recording material 14 to be fed at a high velocity without the danger of tearing or stretching due to excessive friction, the printing member 13 preferably comprises a rotatable metal drum which is axially positioned with respect to the electrodes 10, as illustrated, although many other configurations, such as a simple metallic plate, may alternatively be provided.

It will be appreciated that a flow of electrical current from the printing member 13 to any one of the electrodes 10 will produce a mark upon the electrosensitive material which is dependent upon the position of the electrode concerned. If the current flow is of extremely short duration, a dot results; but if the current flow occurs throughout a longer interval of time, a line is produced whose length and direction is determined by the movement of the recording material 14 with respect to the particular electrode. Therefore, by effecting a flow of current between the common printing member 13 and a particular electrode 10 upon the occurrence of a signal voltage of predetermined amplitude only, a record of this event is accomplished. Furthermore, by causing each successively positioned electrode in the array to be energized at signal voltage levels increasing by voltage amplitude increments corresponding to the spacing between the electrodes, a conventional voltage amplitude versus time curve, representing an input voltage function, may be recorded by a series of marks, as illustrated by the typical recorded voltage function 17.

In order to produce a current impulse from the common printing member 13 to a particular electrode 10 whenever the amplitude of a voltage to be recorded reaches a predetermined voltage level, I provide a voltage level switching network which includes a means for producing a voltage gradient, such as a multi-tapped potentiometer 18 connected as a voltage dividing network from the positive to the negative terminals of a source of unidirectional voltage, such as battery 19. It will be noted that the number of tapped points 20 along the length of the potentiometer 18 is one more than the number of recording electrodes 10 in the array, and that these tapped points 20 are preferably equally spaced as are the electrodes 10. The voltage at each of these tapped points 20 is supplied through a separate grid current limiting resistance 21 to a control electrode 22 of an associated electric discharge device 23, preferably of the triode vacuum tube type which also includes a cathode 24 and an anode 25, as indicated. All of the grid current limiting resistances 21 and all of the discharge devices 23 are preferably of substantially identical construction; and all of the cathodes 24 of these discharge devices 23 are directly interconnected by a common conductor 26 to the negative terminal of a second source of unidirectional potential, such as a battery 27. The cathodes 24 are also connected to one end of a common cathode resistance 28, whose other end is connected through a movable arm 29 of the potentiometer 18 to a determinable voltage point along the voltage gradient produced by the potentiometer 18.

The input signal voltage to be recorded is supplied to the network across the cathode resistance 28 through input terminal leads 30, as indicated. Since all of the cathodes 24 of the devices 23 are connected through common resistance 28 to a common tapped point along the length of potentiometer 18 while the grids 22 of these devices 23 are connected to different consecutively-spaced points 20 thereupon, it will be appreciated that the bias voltage on each of the discharge devices 23 increases by increments proportional to the spacing between each tapped point 20 and has an absolute magnitude which is dependent upon the position of the movable arm 29. The anodes 25 of discharge devices 23 are directly connected through separate, but identical, load resistances 31 to the positive terminal of the unidirectional voltage source represented by battery 27.

The discharge devices 23 and their associated circuits described above constitute what may be termed a "voltage level selection circuit." This voltage level selection circuit functions to produce an output voltage differential between only one pair of adjacently biased discharge devices 23. The particular pair of devices 23 which contains this output voltage differential is, in turn, dependent upon the amplitude level of the input signal, as will be more fully explained hereinafter.

In order to utilize a voltage differential output of this voltage level selection circuit to energize a proper recording electrode 10, I employ a second array of electron discharge devices 32, such as triode vacuum tubes, one less in number than the number of taps 20 and therefore equal in number to the number of recording electrodes 10, and connected as channel selecting or "gating" stages. Each discharge device 23, of the voltage level selection circuit, with the exception of the most negatively and most positively biased devices 23, has its anode 25 directly connected both to a cathode 33 of one of the gating devices 32 and to a control electrode 34 of a successively positioned gating device 32, as indicated. The anode of the most negatively biased discharge device, designated by the letter A, is directly connected only to the cathode of the gating device 32 which is at one end of the array of gating devices, and designated by the letter K, while the anode of the most positively biased discharge device, designated by the leter I, is directly connected only to the control electrode 34 of the gating device 32 located at the other end of the array and designated by the letter L. It is apparent that each of the gating devices 32 are, therefore, biased by the anode voltage difference existing between one pair of adjacent voltage level selection devices 23.

The anodes of all of these gating devices 32 are directly connected through identical load resistances 35 to a point of higher positive potential than the anode potential supplied to the voltage level selection circuit, such as to the positive terminal of a battery 36 whose negative terminal is connected to the positive terminal of the battery 27. The output of each of the gating stages is taken from the anode of the associated triode discharge device 32 and directly connected to a control electrode 37 of a corresponding one of an array of current supplying electric discharge devices 38 connected to form "current supplying channels" for the recording electrodes 10, as will be more fully explained hereinafter. The cathodes 39 of these current supplying devices 38 are all directly connected to the same point of positive potential as that which supplies the anode voltage to the gating circuit. As a result, it is apparent that each of the current supplying devices 38, is biased by the output voltage appearing across the load resistance 35 of an associated gating stage.

The current supplying devices 38 are arranged in sequence so that each device is controlled by a correspondingly and sequentially arranged gating device 32 which, in turn, is biased by the anode voltage difference between adjacent voltage level selection stages. An anode 40 of each of these current supplying devices 38 is directly connected to a correspondingly positioned electrode in the linear array of recording electrodes, so that each electrode 10 is energized by a separate channel comprising a current supplying stage corresponding to one of the current supplying devices 38.

In order to complete the anode-to-cathode circuit of each of these current supplying devices 38, the rotatable printing drum 13, which is in close proximity to all of the electrodes 10, is connected through a common current limiting resistance 41 to a source of high positive potential with reference to the cathodes 39, such as to the positive terminal of a battery 42 whose negative terminal is connected to the cathodes 39 as well as to the positive terminal of the anode voltage supply 36 for the gating circuits. The resistance 41 is preferably of the variable resistance type in order to provide a means for controlling the anode-to-cathode current of the current supplying devices 38.

In order to describe more easily the operation of my invention, it is deemed advisable to consider the condition of the voltage level selection circuit when no input signal voltage is applied. Since each of the control electrodes 22 of the discharge devices 23 are connected to a different voltage point along the voltage gradient provided by the potentiometer 18, while the cathodes 24 of these devices 23 are all connected to a common voltage point thereupon, it will be appreciated that each of the discharge devices 23 is biased in sequentially increasing increments through a voltage range extending from an extremely negative bias to an extremely positive bias. An adjacent series of the discharge devices 23 such as the devices designated by the letters A, B, C and D are therefore biased beyond cut-off and maintained in a nonconducting stage, while the remainder of the devices such as the series of devices designated by the letters E, F, G, H and I are biased above cut-off and therefore are conducting. As a consequence the voltage at the anodes of the non-conducting devices A through D is relatively high and substantially equal to the voltage at the positive terminal at battery 27. While the voltage at the anodes of the conducting devices E through I is relatively low and substantially equal to the voltage at the negative terminal of the battery 27. The only pair of adjacently biased devices 23 which have a large anode voltage differential are, therefore, the tubes D and E. It is evident from this example that there can be only one pair of adjacently biased voltage level selection devices 23 which can have an anode voltage differential at any particular instant of time. It is also evident that the particular pair of adjacent devices 23 which exhibit this anode voltage differential is dependent upon the position of the movable arm 28 of the potentiometer 18, the magnitude of the biasing increments between the devices 23, and the anode current cut-off point of the particular devices 23 employed. Electron discharge devices having sharp cut-off characteristics, are, of course, to be preferred for these stages.

Since each of the channel selecting or gating devices 32 is biased by the anode voltage differential existing between a different pair of adjacent voltage level selection devices 23, it is apparent that only one of the gating devices 32 is non-conducting while all of the remaining gating tubes are conducting. If, for example, the anode voltage differential exists between tubes D and E, then the gating device 32 indicated by the letter J is made non-conducting, since the high anode voltage of the voltage level selecting device D is applied to cathode 33 of gating device J, while the low anode voltage of voltage level selecting device E is applied to the control electrode of this device J. Each of the remaining gating devices have their cathodes and control electrodes at the same potential with the result that these latter gating devices are all conducting.

If the movable arm 29 of potentiometer 18 is set at a particular reference or operating point and a signal voltage is applied across resistance 28 through the input terminals 30, the biasing voltage which exists between the cathodes 24 and the control electrodes 22 of all of the voltage level selection devices 23 varies accordingly. This bias voltage variation causes a corresponding shift in the point of cross-over from conduction to non-conduction within the array of voltage level separation devices 23. If, as in the previous example, the operating point is adjusted so that, in the absence of a signal voltage, the conduction to non-conduction cross-over within the array occurs between the tubes D and E, then a positive-going signal voltage increases the cathode voltage and causes the more positively biased devices, such as the discharge devices E through I to become successively non-conducting. As a result the point of cross-over from conduction shifts towards the devices at the more positively biased end of the array. Conversely, a negative-going signal voltage causes this point of conduction to non-conduction cross-over to shift toward the more negatively biased devices in the array.

The output voltage of each of the gating devices 32, developed across their respective load resistances 35, is applied as a biasing voltage to a corresponding one of the array of current supplying devices 38. The magnitude of the voltage drop produced across each of the load resistances 35 when an associated gating device 32 conducts is sufficient to bias the corresponding current supplying device 38 below cut-off. As a consequence, all of the current supplying devices 36 are maintained in a non-conducting state except the one which is biased by the particular gating device which, in turn, is cut-off by the anode differential voltage between an adjacent pair of voltage level selection stages. The conduction of any of the current supplying devices 38 will effect a current flow from the electrode connected to the anode of that particular device through the electrosensitive material 14 to the printing member 13. The magnitude of this current flow, and therefore the intensity of the resultant mark upon the electrosensitive material, can be controlled by an adjustment of variable resistance 41.

It will therefore be appreciated that upon the application of a signal voltage a mark will be printed upon the recording material, the position of the mark along the transverse dimension of the material being a direct function of the amplitude of the signal voltage. Since the recording material is propelled at a constant speed, an input voltage function will produce a series of marks spread along the recording material with reference to a time axis to form a trace representative of the input voltage function.

Although I have shown an array containing only eight electrodes energized by eight current supplying channels, it is to be understood that any number of electrodes and energizing channels may be included in order to provide a more or less complete trace having a wider or narrower range of deviation as desired. Furthermore, the spacing between the tap points 20 can be made closer or wider in order to provide a greater or lesser sensitivity to variations in the voltage level of an input signal. In addition, a particular wave portion of the input voltage function can be recorded by merely preamplifying the input voltage and by adjusting the movable arm 29 of the potentiometer 18 until the operating point of the voltage level selection circuit is at the voltage center of the desired wave portion.

It is to be understood that while I have shown a particular embodiment of my invention, many modifications can be made, and I, therefore, intend by the appended claims to cover all such modifications as fall within the true spirit and scope of my invention.

What I claim as new and desire to secure by Letters Patent of the United States is:

1. A voltage level switching network for selectively controlling the flow of electrical current in a plurality of independent electrical channels in response to various predetermined amplitude levels of an input voltage function comprising, a current controlling means connected in series relation with each of said channels, an array of electron discharge devices one more in number than the number of said channels and biased in sequence by connections to a series of biasing voltages varying incrementally in amplitude throughout a range extending from a biasing voltage far below cut off to a biasing voltage far above cut off whereby a series of sequentially biased electron discharge devices are conducting while a remaining series of sequentially biased devices are non-conducting, a substantially identical impedance element connected in an output circuit of each of said discharge devices for producing a voltage of one predetermined amplitude from the output circuit of each of said conducting devices and a voltage of a second predetermined amplitude from the output circuit of each of said non-conducting devices so that a large output voltage differential exists only between the pair of sequentially biased discharge devices which represents the cross-over from conduction to non-conduction in said array, means connected to receive a signal voltage for varying the general level of said biasing range in response to said signal voltage thereby to vary said conduction to non-conduction cross-over in said array accordingly, and independent voltage responsive gating means connected to receive the output voltage differential between each pair of sequentially biased electron discharge devices and to control said current controlling means in response thereto.

2. A voltage level switching network comprising voltage dividing means providing a potential gradient, an array of electron discharge devices connected to have a bias potential applied thereto from between a preselected point on said voltage dividing means and one of a series of incrementally and sequentially increasing voltage points thereon, said common point being selected to provide incrementally increasing bias voltages to said devices to render a first series of said devices conducting and a second series of said devices non-conducting in the absence of an input voltage signal, a substantially identical impedance element connected in the output circuit of each of said discharge devices and producing a voltage of one predetermined amplitude at a point in the output circuit of each of said conducting devices and a voltage of a second predetermined amplitude at corresponding point in the output of each of said non-conducting devices so that a voltage difference exists between the outputs of adjacent discharge devices only at the crossover from conducting to non-conducting devices, separate voltage responsive control means each connected to the outputs of an adjacent pair of sequentially biased discharge devices and adapted for energization only when a voltage difference appears between said outputs, and means connected to receive a signal voltage for varying the level of said biases in response to said signal voltage to continuously vary the conduction to non-conduction crossover in said array in accord with said signal voltage.

3. A voltage level switching network comprising a source of unidirectional potential, a voltage dividing network connected in series with said potential source, a plurality of substantially identical electron discharge devices, each having at least a cathode, a control electrode and an anode, a common impedance element connected between said cathodes and preselected common voltage point of said voltage dividing network, electrically conductive means connected to provide a direct current path from each of said control electrodes to one of a series of incrementally and sequentially increasing voltage points of said voltage dividing network biasing said electron discharge device so that one series of sequentially biased devices are conducting, while an adjacent series of sequentially biased devices are non-conducting, a substantially identical impedance element connected in the anode circuit of each of said discharge devices producing a voltage of one predetermined amplitude at the anode of each of said devices and of a second predetermined amplitude at the anode of each of said non-conducting devices so that an anode voltage differential exists only between the anodes of adjacent ones of said sequentially biased devices at the crossover from conducting to non-conducting devices, separate voltage responsive control means each connected between the anodes of a pair of adjacent sequentially biased devices and energizable in response to a voltage differential therebetween, and input terminals connected between said commonly connected cathodes and said preselected common point of said voltage dividing network for applying a signal voltage thereto for varying the general level of biasing of said sequentially biased discharge devices in response to said signal voltage to continuously vary the conduction to non-conduction crossover in said array in accord with said signal voltage.

References Cited in the file of this patent

UNITED STATES PATENTS

| | | |
|---|---|---|
| 2,008,563 | Sarbey | July 16, 1935 |
| 2,312,357 | Odquist et al. | Mar. 2, 1943 |
| 2,331,418 | Nolde | Oct. 12, 1943 |
| 2,469,837 | Mohr | May 10, 1949 |
| 2,479,881 | Wagner | Aug. 23, 1949 |
| 2,541,039 | Cole | Feb. 13, 1951 |